United States Patent
Seaton

(10) Patent No.: US 8,257,154 B2
(45) Date of Patent: Sep. 4, 2012

(54) PULLER FOR USE IN ANIMAL CARCASS BONING OR CUTTING

(75) Inventor: Mark Hamish Seaton, Dunedin (NZ)

(73) Assignee: Robotic Technologies Limited, Dunedin (NZ)

( * ) Notice: Subject to any disclaimer, the term of this patent is extended or adjusted under 35 U.S.C. 154(b) by 347 days.

(21) Appl. No.: 12/519,726

(22) PCT Filed: Dec. 20, 2007

(86) PCT No.: PCT/NZ2007/000386
§ 371 (c)(1),
(2), (4) Date: Sep. 4, 2009

(87) PCT Pub. No.: WO2008/075586
PCT Pub. Date: Jun. 26, 2008

(65) Prior Publication Data
US 2010/0003909 A1    Jan. 7, 2010

(30) Foreign Application Priority Data

Dec. 20, 2006 (NZ) .................................. 552206
Aug. 9, 2007 (NZ) .................................. 560540

(51) Int. Cl.
*A22C 18/00* (2006.01)
(52) U.S. Cl. .................................................. 452/149
(58) Field of Classification Search .............. 452/52–54, 452/106, 107, 125, 127, 132, 166, 187
See application file for complete search history.

(56) References Cited

U.S. PATENT DOCUMENTS

| | | | | |
|---|---|---|---|---|
| 4,164,056 A * | 8/1979 | Hilgner et al. | ................ | 452/128 |
| 4,727,623 A * | 3/1988 | Durand | ........................ | 452/125 |
| 4,873,749 A * | 10/1989 | Couture | ........................ | 452/128 |
| 5,180,328 A * | 1/1993 | Davis | .............................. | 452/128 |
| 5,334,083 A * | 8/1994 | van den Nieuwelaar et al. | .............................. | 452/106 |
| 5,401,210 A * | 3/1995 | Manmoto et al. | ............ | 452/136 |
| 6,152,816 A * | 11/2000 | van den Nieuwelaar et al. | .............................. | 452/177 |
| 6,174,229 B1 * | 1/2001 | Nielsen et al. | ................ | 452/106 |
| 6,227,960 B1 * | 5/2001 | Martin et al. | ................ | 452/118 |
| 6,248,012 B1 * | 6/2001 | Folkmann | .................... | 452/135 |
| 6,364,758 B1 * | 4/2002 | Nielsen et al. | ................ | 452/117 |
| 6,811,478 B2 * | 11/2004 | van den Nieuwelaar et al. | .............................. | 452/117 |
| 7,232,365 B2 * | 6/2007 | Annema et al. | ................ | 452/167 |
| 7,344,437 B2 * | 3/2008 | Van Den Nieuwelaar et al. | .............................. | 452/187 |
| 7,351,134 B2 * | 4/2008 | Mammoto et al. | ............ | 452/149 |

* cited by examiner

*Primary Examiner* — Richard Price, Jr.
(74) *Attorney, Agent, or Firm* — Marshall A. Lerner; Marvin H. Kleinberg; Kleinberg & Lerner, LLP

(57) ABSTRACT

An apparatus for pulling a section of an animal carcass from the carcass wherein the carcass is held using means for holding. The apparatus includes means for anchoring to the section of the carcass, and means for forcibly separating the means for anchoring from the means for holding, preferably in a substantially vertical downwards direction, and thereby remove the section from the carcass. According to preferred embodiments, the means for anchoring may be a hook or a gripper which clamps to the section of the carcass. A system including the apparatus and a corresponding method are also provided.

19 Claims, 3 Drawing Sheets

PULLER FOR USE IN ANIMAL CARCASS BONING OR CUTTING

TECHNICAL FIELD

The invention relates to a device for pulling a bone from the carcass of an animal to assist with the removal of sections of the carcass during a boning or cutting operation. In particular, the invention relates to a puller for pulling the aitchbone or a knuckle from the hind legs of carcasses of animals such as cattle.

BACKGROUND

Boning and cutting operations in the processing of animal carcasses into various sections or cuts has traditionally been labour intensive with all such steps being carried out manually. There has been a trend to automate various operations, where possible, to reduce the number of operators required, increase the speed of operations steps, reduce the incidence of injury to operators, and generally increase efficiencies in the overall process of preparing meat cuts from a carcass.

There are a number of boning or cutting operations that require the manual pulling of part of a carcass in conjunction with cutting. For some operations the force required to be exerted by an operator is considerable. As a consequence, the meat processing industry suffers from a high level of worker injury via accidents and over-use strain. Further, when the labour market is short of workers sufficiently strong and skilled to carry out manual pulling operations, any improvement that eliminates or reduces the need forceful manual pulling operations widens the potential labour pool. In other words, the task required can be performed by people who are not as strong, or not as skilled.

A constant objective of the meat processing industry is to improve the financial yield from each carcass. This generally means increasing the volumetric yield per carcass (e.g. less meat left on scrap sections such as bones), increasing the yield per cut (cutting accuracy), and increasing the volume of higher value cuts (improved accuracy allows the ability to bias cuts towards high value).

Meat processing systems typically use a chain to pull at the carcass. Those systems that have a horizontal aspect in their pulling motion can endanger an operator because when the meat or bone has been freed it has a tendency to swing wildly on the chain. Some systems counter this by using a short linkage which has a reasonably predictable motion. When the meat or bone has been freed, the linkage typically collapses downwards onto a catch tray allowing the operator to stay out of the way of its motion.

Other systems typically use a hook to engage into the meat or bone. This is damaging to the meat, and can rapidly release if the meat or bone tears or breaks, adding to the hazard described above.

GB-A-2,277,245 describes an apparatus for boning a carcass. An overhead rail carries carcasses suspended on transport hooks. A drop arm is pivotally mounted to a bracket at one end and has a link chain attached thereto at the other end. A further hook is attached to the chain. During operation, the further hook is attached to a portion of a carcass and a generally downward force is applied to the drop arm by a pneumatic ram, thereby forcing a skeletal part or bone from the carcass. GB-A-2,277,245 does not overcome the aforementioned problems of arrangements using hooks to engage portions of a carcass. Also, due to the drop arm being pivotally mounted, GB-A-2,277,245 does not describe an arrangement that removes horizontal aspects from the pulling motion and therefore provides no solution to the hazards associated therewith.

GB-A-2,412,565 describes an apparatus not dissimilar to that of GB-A-2,277,255. A carcass is suspended from a support rail. A hook is attached to a fixed post via a link chain. The hook engages a bone portion of the carcass and, as the carcass is moved along the support rail, the bone portion is forcibly removed from the carcass. GB-A-2,412,565 does not provide a solution to the problems associated with the use of hooks, nor those associated with horizontal aspects in the pulling motion.

GB-A-2,294,382 describes another chain and hook arrangement in which the chain and hook is fastened to a support structure that moves an operator up and down under the control of a foot operated control. This arrangement is fixed, has the disadvantages associated with chain linkages and is difficult for an operator to control.

It is an object of the invention to overcome at least some of the problems or disadvantages associated with known apparatus for use in animal carcass boning or cutting, or to at least provide a useful choice.

STATEMENTS OF INVENTION

In a first aspect, the invention provides an apparatus for pulling a section of an animal carcass from a carcass wherein the carcass is held using means for holding, the apparatus comprising:
  i. means for anchoring to the section of the carcass via a linkage having a constrained range of movement; and
  ii. means for forcibly separating the means for anchoring from the means for holding and thereby removing the section from the carcass.

In one embodiment the means for anchoring comprises a gripper for clamping to the section of the carcass.

In another embodiment the means for anchoring comprises a hook.

Preferably, the means for anchoring is coupled to a first end of an arm. The arm may be a substantially rigid element.

Preferably, the means for anchoring is pivotally coupled to the first end of the arm.

Preferably the arm comprises one or more additional substantially rigid elements, each element being pivotally and/or slidably coupled to another one of said elements.

Preferably, the means for forcibly separating is adapted to separate the means for anchoring from the means for holding in a substantially vertical direction.

By separating the means for anchoring from the means for holding in a substantially vertical direction, it is possible to better control movement of the means for anchoring and the removed section of the carcass, particularly in embodiments in which the means for anchoring is located underneath the means for holding.

Preferably, the means for forcibly separating comprises a pneumatic or hydraulic ram.

The means for forcibly separating may be controlled by a control element operated by a user. In one embodiment this may be a moveable handle associated with the means for anchoring.

Preferably, the apparatus comprises a base portion coupled to the means or anchoring and the means for forcibly separating.

Preferably, a second end of the arm is coupled to the base portion. More preferably, the second end of the arm is pivotally coupled to the base portion.

The apparatus may include means for catching the section of the carcass after it has been removed therefrom, the means for catching may be coupled to and/or located on the base portion.

Preferably, the apparatus comprises an elongate first member adapted to engage an elongate second member. More preferably, the first member slidably engages the second member.

Preferably, the second member is hollow and has an inner surface adapted to slidably engage an outer surface of the first member.

Preferably, the first member is coupled to the means for anchoring.

Preferably, the second member is coupled to the means for forcibly separating, whereby separation of the means for anchoring from the means for holding causes the first member to move relative to the second member.

Preferably, the apparatus comprises means for supporting the apparatus, wherein the means for supporting is adapted to facilitate movement of the apparatus between first and second positions.

Preferably, the means for supporting is adapted to engage a first support rail, whereby movement of the apparatus between the first and second positions is effected by movement of the means for supporting along the first support rail.

Embodiments of the apparatus of the invention may be configured with varying levels of automation. In one embodiment an operator may manually attach the means for anchoring to the section of the carcass and then manually actuate the means for forcibly separating whilst at substantially the same time making cuts, if necessary, to aid in the removal of the section from the carcass. Manual actuation may be by way of an operator moving a handle associated with means for anchoring or some similar control element such as a button.

According to an alternative embodiment, a sensor is provided for detecting the position of the section of the carcass. Preferably, the sensor comprises means for receiving and analysing an x-ray image of the carcass and determines the location of the relevant section therefrom. For example, a particular bone portion may be identified. Using this information, the means for anchoring, if equipped with suitable actuators and control means (as are well known in the field of robotics), may then automatically grip the section of the carcass at the desired location/position without the need for human intervention. After the section has been successfully gripped, the means for forcibly separating may be automatically actuated. The means for forcibly separating may comprise a force feedback loop so as to provide for automatic control of the level of force being applied. Thus, it is possible to stop the application of force after the section has been removed. Additionally, the force feedback loop may be used to vary the force applied during the removal of the section. For example, the force may gradually be increased until the force feedback loop detects a drop which may be indicative of the section beginning to detach from the carcass. At this point, the force can be decreased as less force may be required. This feature can further help to control the movement of the section on removal from the carcass since only sufficient force to effect removal of the section from the carcass may be used.

The cutting operation if required, may additionally or alternatively be automated according to a particular preferred embodiment. According to this embodiment, an imaging apparatus (visual and/or x-ray) ay be used to identify portions requiring cutting. One or more blades may be mounted on robotic arm s for this purpose, with control means being provided to direct the blades to make cuts to the identified portions (again, as would be within the competencies of a man skilled in the field of robotics). Thus, embodiments of the invention may provide a fully automated apparatus for the boning of a carcass.

According to a second aspect, the invention provides a system for pulling a section of an animal carcass from the carcass, the system comprising the apparatus of the first aspect and the means for holding the carcass.

Preferably, the means for holding comprises a hook.

Preferably, the means for holding is adapted to engage a second support rail, More preferably, the means for holding is adapted to movably engage the second support rail.

Preferably, the system comprises means for locking movement of the apparatus relative to the means for holding. Thus, the system may be adapted to enable the section to be removed whilst the carcass is moving around a plant, thereby improving efficiency.

According to a third aspect of the invention, there is provided use of the apparatus of the first aspect and/or the system of the second aspect for pulling a section of an animal carcass from the carcass.

In a fourth aspect, the invention provides a method of pulling a section of an animal carcass from the carcass, the method comprising attaching the carcass to means for supporting; attaching means for anchoring to the section of the carcass; actuating means for separating and substantially simultaneously making cuts in the carcass proximate to the section, wherein actuation of the means for separating causes separation of the means for anchoring from the means for supporting, thereby removing the section from the carcass.

As discussed above in relation to the apparatus of the invention, the method of the invention may be performed using various levels of automation.

Preferred embodiments of the invention may be used to remove a section from the carcass of a vide variety of animals, including but not limited to sheep, cattle, goats and pigs. Depending on the particular type of animal carcass and the section of the carcass to be removed, the means for anchoring may be adapted accordingly so as to be appropriately dimensioned and configured to grip the relevant section with sufficient force. Similarly, due to the differing force requirements for different types of animal carcass and the different sections of the carcass to be removed, the means for forcibly separating may be adapted to provide the particular required force.

According to preferred embodiments of the invention, the means for anchoring is adapted to grip a skeletal section of a carcass, such as the aitchbone or the knuckle.

Further aspects of the invention, which should be considered in all its novel aspects, will become apparent to those skilled in the art upon reading the following description which provides at least one example of a practical application of the invention.

BRIEF DESCRIPTION OF THE FIGURES

One or more embodiments of the invention will be described below by way of example only and without intending to be limiting with reference to the following drawings, in which.

DETAILED DESCRIPTION

Figure 1:
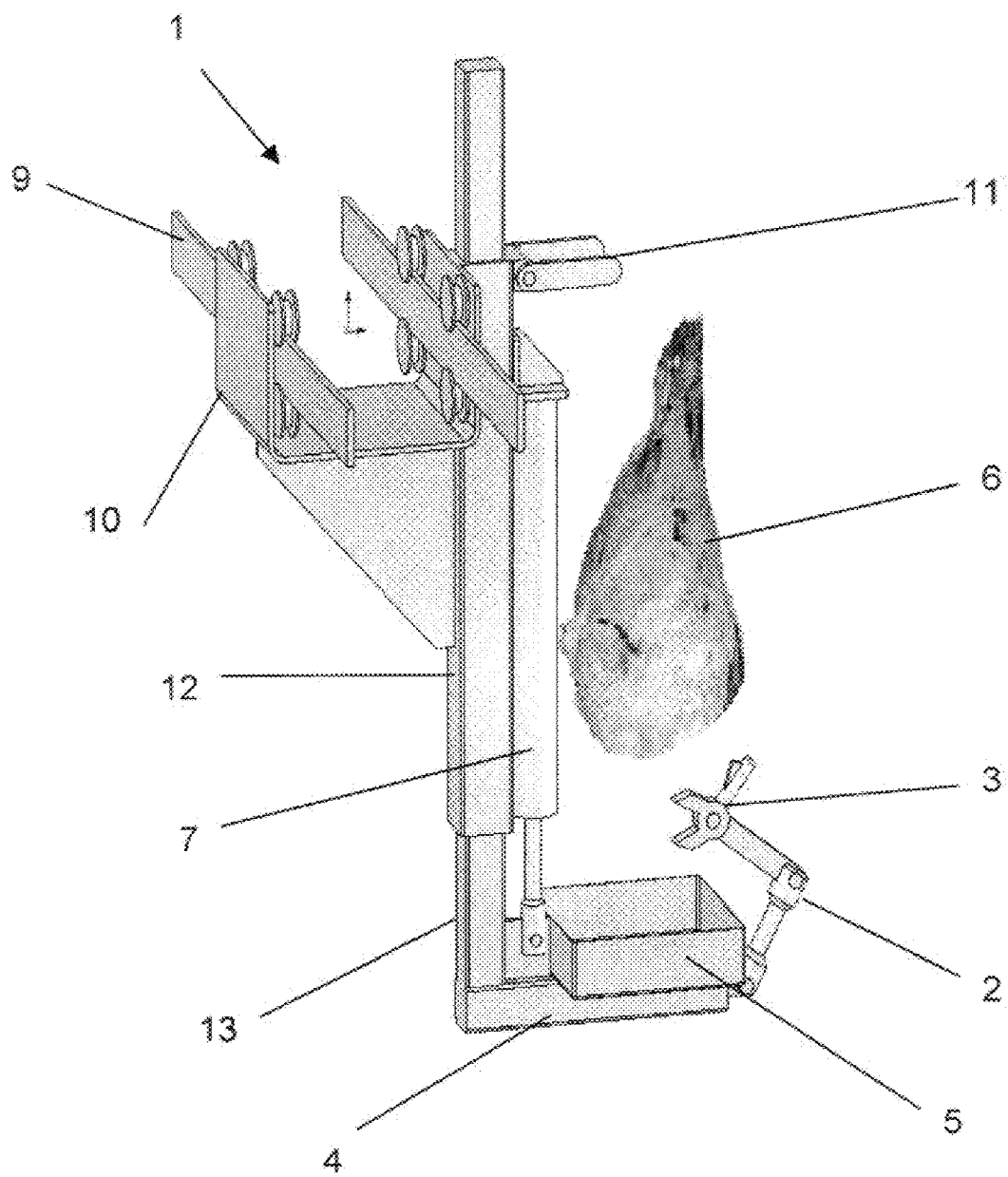
FIG. 1 shows a perspective view of an apparatus according to a first embodiment.
Figure 2:
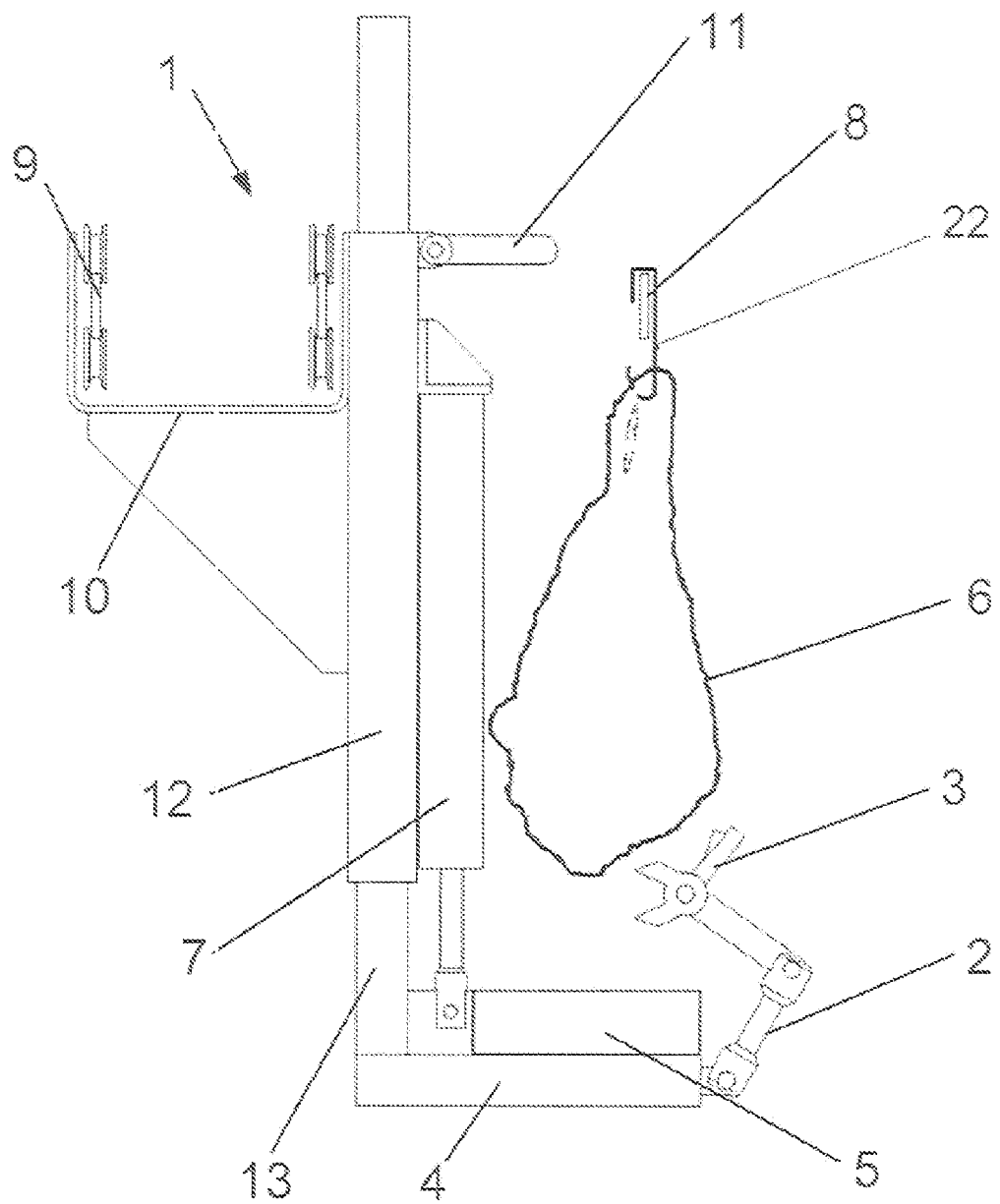
FIG. 2 shows a side elevation of the embodiment of FIG. 1.

Referring to FIGS. 1 and 2, there is shown an embodiment of the apparatus of the invention, generally marked 1. Apparatus 1 includes a flexible link/arm 2 having a gripper 3 provided at one end thereof for gripping a section of animal carcass 6. Note that animal carcass 6 may itself be a portion of and not an entire animal carcass and "carcass" should be interpreted as such throughout the specification. Flexible link/arm 2 is fixed to a base portion 4 of apparatus 1. Catch tray 5 is located on base portion 4 for catching the section of animal carcass 6 when it falls after being pulled from carcass 6. Apparatus 1 also includes pneumatic or hydraulic cylinder 7 for urging gripper 3 away from carcass 6 and thereby remove the section. Carcass 6 is attached via a hook 22 moveably mounted on ceiling mounted conveyor rail 8, whereas apparatus 1 is connected to trolley rails 9 which are also preferably ceiling mounted.

Embodiments of the invention may be adapted for use in combination with systems found in existing meat processing plants. In particular, embodiments of the invention are preferably adapted to be used in conjunction with known conveyor rails used for transporting a carcass, or portions thereof, around such plants. Typically, such systems use a ceiling mounted conveyor from which carcasses are suspended using hooks to firmly hold and support the carcass.

Gripper 3 is used to attach to a section of carcass 6. According to preferred embodiments, gripper 3 is adapted to attach to a bone/skeletal portion of carcass 6, such as an aitchbone or knuckle. In this embodiment, gripper 3 comprises at least two opposing surfaces for clamping to the section of carcass 6. Different grippers may be used for different sections of carcass 6 to be removed, as well as for carcasses of different animals. Thus, apparatus 1 may include a plurality of grippers 3 on a corresponding plurality of flexible link arms 2 attached to base portion 4. Alternatively, a single link arm 2 may be provided wherein a variety of grippers 3 may be interchangeably coupled thereto or a separate apparatus 1 may be used for each type or a subset of types of sections to be removed from carcasses of each type or a subset of types animals.

An operator may provide the clamping force required to hold the section in gripper 3. However, preferably, urging means are provided which generate the desired clamping force, thereby improving ease of use for an operator.

Flexible link arm 2 enables gripper 3 to be placed in the position for gripping the section of carcass 6. The links of arm 2 may be manually operated with a user manually placing gripper 3 in position. Preferably, resistance means are provided for enabling gripper 3 to maintain its position when an operator releases his hold on gripper 3. More preferably, link arm 2 is powered using, for example, electromotive/pneumatic/hydraulic means, which enable an operator to indirectly move gripper 3 via link arm 2 using a haptic input device or the like. Thus, an operator is not required to be located next to carcass 6 which may provide for improved safety and hygiene. According to preferred embodiments, flexible link arm 2 and gripper 3 may be fully automated so that operator interaction is not necessary. According to such embodiments, sensing means (not shown) may identify the section of carcass 6 to be removed. The sensing means may include an imaging apparatus and preferably includes an x-ray imaging apparatus for identifying bone portions in carcass 6. Control means (not shown) may then be used to move gripper 3, via link arm 2, to the appropriate position so that gripper 3 grips the desired section of carcass 6.

The use of a gripper instead of a more traditional hook reduces the tendency of the device to break away from the section of carcass 6. This can be particularly problematic in some cases, such as in the soft-siding of the aitchbone or tearing of the gristle around the patella.

After the section of carcass 6 is firmly gripped by gripper 3, pneumatic or hydraulic cylinder 7 may be actuated. Since carcass 6 is firmly coupled to conveyor rail 8, upon actuation of cylinder 7, gripper 3 is urged away from carcass 6 (preferably in a substantially downwards vertical direction) thereby pulling and removing the section from carcass 6. The movement of link arm 2 is constrained to be substantially in the plane normal to its central pivotal connection. This effectively constrains movement of gripper 3 (and any part of a carcass gripped by it) to downward movement into tray 5.

Cylinder 7 provides one example device for generating the required force and the invention is not limited thereto. It is intended that variants that would be apparent to one of skill in the art are also included within the scope of the invention. For example, base portion 4 may be coupled to a substantially vertical rigid member having teeth along a surface thereof that are adapted to engage a drive wheel that provides the motive force.

Catch tray 5 is provided to collect the removed section and reduce the incidence of meat falling to the floor. Catch tray 5 is shown provided on base portion 4. Alternatively, a tray may be provided underneath the apparatus. As a further alternative, a suitably sterile and hygienic conveyor belt may be provided underneath the apparatus, such that, removed sections fall thereron and are then carried to a collection point.

The apparatus of the invention is preferably configured to move around a processing plant as the carcasses move on conveyor rail 8. However, the invention may be adapted to be stationary and placed along the path of conveyor rail 8 such that carcasses are processed when they reach the apparatus.

Where the apparatus is configured to be movable, it may be mounted on or coupled to trolley device 10 that is adapted to engage trolley rails 9. According to preferred embodiments of the invention, trolley rails 9 run adjacent and substantially parallel to at least a portion of conveyor rail 8. Trolley device 10 and/or trolley rail 9 may be powered to provide the movement of the apparatus. Preferably, trolley device 10 is enabled to move at a speed that matches that of conveyor rail 8 so that the speed of the apparatus matches that of carcass 6, thereby maintaining the apparatus in a fixed position relative to carcass 6 and enabling the apparatus to process carcass 6 as it moves around the processing plant.

Latch 11 may be provided to mechanically lock the motion and position of the apparatus relative to carcass 6. In the embodiment shown, latch 11 is a forked member, the prongs of which may be used to engage a portion of the means (e.g. a hook) used to suspend the carcass. Preferably, latch 11 is hinged to provide for ease of use in engaging and disengaging. As an alternative to latch 11, sensing means may, be used to determine the position of the apparatus and carcass 6 and provide data thereon to a controller which may then appropriately control the speed of trolley device 10 and/or conveyor rail 8.

According to one embodiment, no drive means are provided for trolley device 10 or trolley rail 9 and movement of the apparatus is effected by an operator pushing the apparatus into position along trolley rail 9. Latch 11 may still be used so as to maintain the fixed position of the apparatus relative to carcass 6.

After the section of carcass 6 has been removed, the apparatus may be moved in the reverse direction so that it may begin processing the next carcass. According to a preferred embodiment of the invention, a plurality of boning apparatus are provided side by side but spaced apart along trolley rails 9 so that a corresponding plurality of carcasses may be substantially simultaneously processed. After all of the carcasses have been processed, the plurality of boning apparatus may then be stepped backwards to be in position for processing a further plurality of carcasses.

Whilst particular means for effecting motion of the apparatus are shown, the invention is not to be limited to this embodiment. The embodiment shown is advantageous in that it serves not only to allow the apparatus to be moved but also to maintain the apparatus substantially vertical. The skilled man would be aware of modifications to the embodiment shown as well as alternative arrangements that may be used and it intended that all such modifications and alternatives be included within the scope of the invention.

Apparatus 1 is shown as further including members 12, 13. Member 12 and 13 serve to improve the rigidity of the apparatus and also to ensure a consistent and smooth operation of cylinder 7 in a vertical direction. First member 12 is preferably a hollow, elongate member which slidably engages an outer surface of second member 13. Second member 13 is coupled to base portion 4 and first member 12 is coupled to trolley device 10 such that second member 13 is urged downwards relative to first member 12 when cylinder 7 is actuated. Embodiments of the invention may omit members 12, 13. In such embodiments, a first portion of cylinder 7 may be directly and rigidly coupled to trolley device 10 and a second portion of cylinder 7 rigidly coupled to base portion 4. Base portion 4 may also be omitted, in which case, the second portion of cylinder 7 may be rigidly coupled to one end of link arm 2.

According to semi-automated embodiments of the invention, and fully automated embodiments of the invention which allow for operator intervention and/or override, operator controls (not shown) are provided that are easily accessible to the operator. According to preferred embodiments, such controls are configured so that only, one hand is required to operate them at times when the other hand is required for making cuts to carcass 6, as is discussed in more detail below. The controls may include actuators for positioning gripper 3, causing gripper 3 to grip the section, to effect the pulling operation and to control movement of the apparatus via trolley device 10.

The method of the invention will now be described. Operation begins with apparatus 1 being fixed in position relative to carcass 6. Where apparatus 1 is adapted to process carcass 6 whilst in motion, the horizontal motion of apparatus 1 is synchronized with that of carcass 6. For example, the operator may manually latch trolley device 10 to conveyor rail 8 or suitable sensors and control means may be provided to automatically control the relative positions.

Depending on the type of animal carcass and the section to be removed, the operator may perform precutting, as required, around the section so as to provide for cleaner removal of the section from carcass 6 and possibly enable gripper 3 to more easily, firmly and accurately grip the section of carcass 6. For example, this may involve freeing an edge of an aitchbone or knuckle. This step may be automated if desired. For example, a visual and/or x-ray imaging apparatus may be used to identify where cuts are to be made. Control means may then be used to make the necessary cuts using a knife mounted on a robotic arm.

Cylinder 7 may then be actuated to adjust the position of gripper 3 and link arm 2 so that gripper 3 is at an appropriate height for coupling to the section of carcass 6. Link arm 2 and/or gripper 3 may also be moved until the jaws of gripper 3 are either side of the gripping position on the section of carcass 6. Controls may then be used to cause the jaws to close and grip the section, such as an aitchbone or knuckle. According to preferred embodiments, griper 3 is biased into the closed position whereby, on release of the controls by the operator, the gripper 3 jaws automatically close. The coupling of gripper 3 to the section may be performed manually by the operator or may be automated to varying degrees as discussed hereinbefore.

After the section has been gripped, the operator may pick up a knife and use the hand not holding the knife to operate cylinder 7 such that a downwards force is applied through gripper 3 and link arm 2. A control element may be provided in association with gripper 3 to operate cylinder 7. The control element may be a button or a handle moveable relative to gripper 3. A handle may actuate an actuator by mechanical actuation of an actuator, such as a control valve, via a suitable linkage, such as a cable. Alternatively a button may actuate an electrical actuator controlling a valve etc. The knife may be used to free the ends of muscle and sinew from their connection points on the section of carcass 6, so that the pulling action can be used to cleanly separate the meat from the bone. As previously mentioned, actuation of cylinder 7 and/or movement of the knife may be automated.

When the last of the section of carcass 6 has been cut or pulled from carcass 6, it is dropped onto catch tray 5. The operator opens the jaws of gripper 3, removes the section from catch tray 5 and moves the apparatus, using trolley device 10, to the next carcass 6 to restart the sequence. Use of catch tray 5 reduces the number of "dropped cuts" (i.e. cuts of meat that drop onto the floor), which would have to be condemned or downgraded. Again, these steps may be automated such that operator intervention is not required.

According to a preferred embodiment, separate apparatus according to the invention may be provided for each section of carcass 6. For example, where carcass 6 is a leg, one apparatus may be used to remove the aitchbone and one used to remove the knuckle. Separate operators may stationed at each apparatus with an additional operator stationed therebetween with the task of removing the rump. However, depending on cycle time requirements, a single apparatus operated by a single operator may be used for both pulling operations and any intermediate operations.

Figure 3:
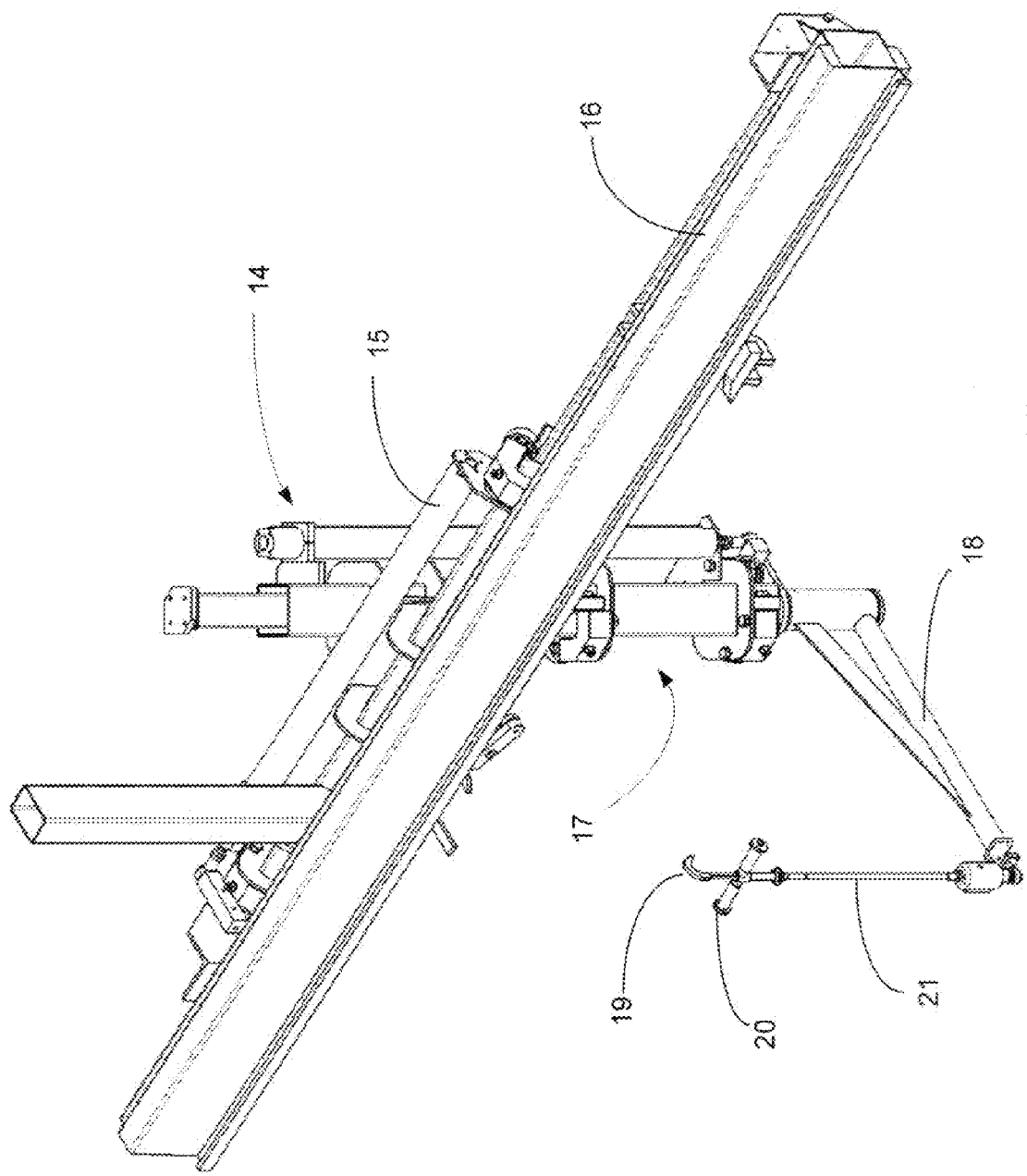
FIG. 3 shows a perspective view of an apparatus according to a second embodiment.

Referring now to FIG. 3 an embodiment utilising a hook and handle control element will be described. As with the previous embodiment, apparatus 14 is mounted to a carriage 15 that is moveable along rail 16. A hydraulic or pneumatic ram 17 raises and lowers base portion 18 with respect to carriage 15. In this embodiment a hook 19 is used. Whilst the gripping device described in the previous embodiment has the advantages noted, the hook is a standard device used in the industry which some users prefer to use. It also avoids the need for an operator to operate a gripping device. In this embodiment hook 19 is connected to one end of the inner core of cable 21 with the other end of the core of the cable being attached to a valve spool of a control valve (not shown). Handle 20 is connected to the outer sheath of cable 21 with the other end of the outer sheath being connected to the body of the valve. As a user moves handle 20 relative to hook 19 the control valve controls ram 17 to raise and lower base portion 18. In this way a user can control ram 17 with one hand whilst using a knife in the other hand. Cable 21 is semi-flexible and so constrains the movement of hook 19 with respect to base portion 18. This is a simple and robust control approach suited to a meat processing environment.

The present invention provides new and improved means and methods for boning a carcass. It increases the consistency of cutting (because worker fatigue is reduced), allows a greater pulling force to be used (which encourages the operator to do less cutting, and hence pulls the meat cleanly from the bone), opens the cuts to allow the operator better visibility of cut lines and allows the operator to stand in a position better suited to cutting than pulling in which the operator may have better visibility for the task and be able to perform more accurate down-hand style cutting.

Embodiments of the invention may be easily integrated with most existing boning rooms, in line with conventional overhead conveyors. Most existing boning systems are statically mounted and are therefore difficult to integrate in-line. Being able to synchronize movement of the apparatus with existing conveyors used to carry carcasses also makes the system more suitable for automation of additional steps.

Furthermore, since the apparatus is adapted to perform its pulling in isolation to the conveyor motion (as opposed to some other systems that attempt to use the conveyor motion to effect the pulling), the apparatus is able to fit in with and not adversely affect the standard carcass flow, while at the same time allowing an operator to stop and start the pulling as required. This also enables the apparatus of the invention to take up less space than conventional arrangements, particularly those which are horizontally oriented.

Although the invention has been described by way of example, it should be appreciated that variations and modifications may be made without departing from the scope of the invention. Furthermore, where known equivalents exist to specific features, such equivalents are incorporated as if specifically referred to in the specification.

The invention claimed is:

1. An apparatus for pulling a section of an animal carcass from a carcass wherein the carcass is held using means for holding, the apparatus comprising:
   i. means for anchoring to the section of the carcass via a linkage having a constrained range of movement;
   ii. means for forcibly separating the means for anchoring from the means for holding and thereby removing the section from the carcass; and
   iii. a control element associated with the means for anchoring to control the means for forcibly separating.

2. An apparatus as claimed in claim 1 wherein linkage is constrained to move substantially in one plane.

3. An apparatus as claimed in claim 1 wherein the linkage is constrained to allow the means for forcibly separating to move the means for for anchoring in substantially only a downward direction.

4. An apparatus as claimed in claim 1, wherein the means for forcibly separating is adapted to separate the means for anchoring from the means for holding in a substantially vertical direction.

5. An apparatus as claimed in claim 1, wherein the means for forcibly separating comprises a pneumatic or hydraulic ram.

6. An apparatus as claimed in claim 1 wherein the means for forcibly separating includes a linear guide for guiding the means for anchoring away from the means for holding.

7. An apparatus as claimed in claim 1, including means for supporting the apparatus adapted to engage a support rail, whereby movement of the apparatus between the first and second positions is effected by movement of the means for supporting along the support rail.

8. An apparatus as claimed in claim 1 wherein the means for anchoring comprises a gripper for clamping to the section of the carcass.

9. An apparatus as claimed in claim 8 wherein the gripper is coupled to a first end of an arm, the arm including a substantially rigid element.

10. An apparatus as claimed in claim 9 wherein the gripper is pivotally coupled to the first end of the arm.

11. An apparatus as claimed in claim 10 wherein the arm includes one or more additional substantially rigid elements, each element being pivotally and/or slidably coupled to another one of said elements.

12. An apparatus as claimed in claim 11 wherein the means for forcibly separating is a ram and movement of the handle relative to the hook controls a control valve to control the ram.

13. An apparatus as claimed in claim 10 wherein the control element is a handle that is moveable relative to the hook.

14. An apparatus as claimed in claim 10 wherein the control element is an electric control element.

15. An apparatus as claimed in claim 9 wherein a control element is associated with the hook.

16. An apparatus as claimed in claim 8 wherein the linkage is connected to the hook at a distal end and to the means for forcibly separating at the proximal end.

17. An apparatus as claimed in claim 1 wherein the means for anchoring comprises a hook.

18. A system for pulling a section of an animal carcass from the carcass, the system comprising:
   i. the apparatus as claimed in claim 1; and
   ii. a support rail along which the apparatus may be conveyed.

19. A method of pulling a section of an animal carcass from the carcass, the method comprising:
   i. attaching the carcass to means for supporting;
   ii. attaching means for anchoring to the section of the carcass;
   iii. actuating means for separating by operation of a control element associated with the means for anchoring and substantially simultaneously making cuts in the carcass proximate to the means for anchoring, wherein actuation of the means for separating causes separation of the means for anchoring from the means for supporting, thereby removing the section from the carcass.

* * * * *